United States Patent [19]
Gonzalez et al.

[11] Patent Number: 5,823,787
[45] Date of Patent: Oct. 20, 1998

[54] TRAINING MANNEQUIN FOR MANAGEMENT OF NORMAL AND ABNORMAL AIRWAYS

[75] Inventors: René M. Gonzalez, Coppersburg; John J. Schaefer, III, Pittsburgh, both of Pa.

[73] Assignee: Medical Plastics Laboratory, Inc., Gatesville, Tex.

[21] Appl. No.: 932,162

[22] Filed: Sep. 17, 1997

[51] Int. Cl.[6] .................................................. G09B 23/28
[52] U.S. Cl. .......................................... 434/265; 434/267
[58] Field of Search ................................... 434/262, 267, 434/268, 270, 265

[56] References Cited

U.S. PATENT DOCUMENTS

| | | | |
|---|---|---|---|
| 3,562,925 | 2/1971 | Baermann et al. | 434/265 |
| 3,568,333 | 3/1971 | Clark | 434/265 |
| 3,916,535 | 11/1975 | Hewson . | |
| 4,484,896 | 11/1984 | Kohnke . | |
| 4,850,876 | 7/1989 | Lutaenko et al. | 434/265 |
| 5,055,052 | 10/1991 | Johnsen | 434/265 |
| 5,330,514 | 7/1994 | Egelandsdal et al. . | |
| 5,540,592 | 7/1996 | Scheinberg et al. . | |

OTHER PUBLICATIONS

"A New Method For Teaching the ASA Difficult Airway Management Algorithm Using a Full Scale Human Simulator", *Anesthesiology*, vol. 85, No. 3A, Sep. 24, 1996, authors: Rene' M. Gonzalez and John J. Schaefer, III.

*Primary Examiner*—Kien T. Nguyen
*Attorney, Agent, or Firm*—Craig G. Cochenour

[57] ABSTRACT

A mechanical mannequin apparatus for demonstrating medical management of human normal and abnormal airways is disclosed. The mechanical mannequin apparatus includes airway elements that resemble those found in infant, children and adult human beings and includes at least one restrictor mechanism attached to at least a portion of at least one of the airway elements for causing sealing engagement against and volume restriction of at least one of the airway elements. The mechanical mannequin apparatus also includes an esophagus tube member, a stomach cavity, jaw adjusting mechanism and neck adjusting mechanism.

24 Claims, 4 Drawing Sheets

TRAINING MANNEQUIN FOR MANAGEMENT OF NORMAL AND ABNORMAL AIRWAYS

BACKGROUND OF THE INVENTION

1. Field of the Invention

This invention relates to a mechanical training mannequin apparatus simulating an anatomically correct airway of a human being for practicing realistic medical management of normal and abnormal or difficult airways.

2. Brief Description of the Background Art

Medical teaching mannequins are currently available that exhibit some of the anatomically correct features of the airway (respiratory tract) of a human being. Generally, these currently available teaching mannequins resemble average human beings with normal airway anatomy. These mannequins are for use in teaching the principles of emergency airway management in uncomplicated medical airway scenarios that are required for unconscious, semi-conscious, critically ill or severely injured patients. For example, a number of patents disclose medical teaching mannequins that attempt to simulate the airway structures of human beings for practicing bag-mask ventilation, endotracheal intubation or artificial respiration of a human airway in uncomplicated clinical scenarios. While these mannequins are fairly inexpensive, they are severely limited by the fact that a significant percentage of real human patients have abnormal or difficult airway anatomy. Therefore, it will be appreciated by those skilled in the art that proper and successful management of patients with abnormal or difficult airway anatomy is one of the most demanding challenges in medical practice with life or death consequences for the patient. While computer aided mannequins have been suggested to simulate abnormal or difficult human airway anatomy, their use by the general medical community is limited due to the overwhelming expense of acquiring, operating and maintaining them. Thus, it will be understood by those skilled in the art that there is a long and unmet need in the medical community for an inexpensive mechanical mannequin apparatus for teaching the principles of airway management ranging from a spectrum of normal to abnormal human airway anatomies. None of the background art addresses nor is concerned with providing an inexpensive mechanical training mannequin as provided by the present invention that is capable of simulating both normal and abnormal or difficult human airway clinical scenarios and which can be activated to resemble a crisis situation by an instructor. The crisis situation that is provided by the mechanical mannequin apparatus of the present invention includes the ability to resemble the abnormal human airway anatomy situations described in the "emergency pathway" as set forth in the American Society of Anesthesiologists (hereinafter "ASA") "difficult airway algorithm" (as defined, in part, herein).

The ASA "difficult airway algorithm" sets forth a written flow chart of medical clinical scenarios ranging from uncomplicated airway scenarios to complicated airway scenarios. The ASA "difficult airway algorithm" also sets forth primary and alternative medical strategies for coping with clinical scenarios wherein initial attempts employing commonly used intubation and other artificial respiration techniques known by those skilled in the art are unsuccessful. The ASA "difficult airway algorithm" classifies these strategies as either a "non-emergency" pathway (ie. wherein ventilation is adequately restored to the patient through mask ventilation or through a successful attempt employing commonly used oral-tracheal or nasal-tracheal intubation techniques), or an "emergency" pathway (ie. wherein repeated attempts employing commonly used intubation techniques fail and mask ventilation is inadequate to restore ventilation).

U.S. Pat. No. 3,916,535 (Hewson) discloses a mannequin for demonstrating mouth to mouth ventilation of the human lungs. The mannequin teaches a head having a neck portion that includes a socket that receives a ball. The ball is fixed to a support for enabling the head to tilt back and forth and turn side to side. The head has an air passage that extends from the mouth of the mannequin to the socket. The ball has a second air passage. This patent discloses that when the head of the mannequin is placed in the proper position, such as the head of a human that is to receive resuscitation, the air passage in the head is placed in registration with the second air passage of the ball such as to allow air to flow through the mouth of the mannequin, into the air passageways of the socket and the ball and into a chest cavity. This patent is concerned only with teaching the proper placement of the head to successfully administer mouth to mouth resuscitation or other external artificial respiration techniques.

U.S. Pat. No. 4,484,896 (Kohnke) discloses a simulator for practicing tracheal intubation having a mannequin head attached to a support and having a skull including a movable jaw, and a neck connected to the skull and support to enable the mannequin head to be tilted forwards and backwards. This patent teaches a simulator having an oral cavity and a throat comprising a thin-walled funnel shaped element having two ducts, one simulating a trachea containing a non-collapsible tube and the other an esophagus. This patent is concerned with providing a simulator for enabling an operator to introduce a blade of a laryngoscope into the oral cavity of the mannequin head and to place the tip of the blade of the laryngoscope into the funnel-shaped element. This patent sets forth further that pressing the laryngoscope blade against the lower jaw of the mannequin will allow the operator to view the mannequin's mouth and throat for introduction of a standard tracheal tube into the mannequin's mouth and into the duct simulating the trachea. This patent is concerned with allowing an operator to practice using a laryngoscope for establishing the position needed before performing a tracheal intubation.

U.S. Pat. No. 5,330,514 (Egelandsdal et al.) discloses a mannequin for practicing cardiopulmonary resuscitation (CPR) having a head, a thorax and lungs in the form of a bag. This patent states that the thorax is formed by a hollow body which is in air exchange relationship with the atmosphere and which has stiffening ribs which reproduce approximately human ribs. This patent states, because of the arrangement, number and size of the stiffening ribs and the certain wall thickness of the hollow body, that the compressibility and return force of the thorax correspond to those of a human thorax. This patent sets forth that the thorax has a cover formed of an elastically deformable material that covers the hollow body and which is releasably mounted to the hollow body. This patent sets forth that the elasticity of the cover determines the inflation resistance of a bag to approximate the inflation resistance of the human lungs. This patent is concerned with providing a mannequin for simulating the correct filling air pressure of the human lungs for teaching a CPR trainee to adequately perform artificial mouth to mouth or mask respiration and external heart compression.

U.S. Pat. No. 5,540,592 (Scheinberg et al.) discloses a training mannequin for use in teaching students of CPR. This patent states that the mannequin includes a head, a neck and a torso molded integrally of a resilient material allowing flexure of the neck. This patent sets forth that the head portion has a mouth defining an opening which communicates with a tubular airway extending rearwardly from the mouth toward a generally planar back side of the head. This patent states that an airway opening, which is at the opposite end of the tubular airway communicating with the mouth, is located on the back side of the head of the mannequin. This patent teaches placing a restrictor within the tubular airway for restricting the flow of air through the airway to simulate the normal resistance to forcing air into a person during CPR. Further, this patent states that the restrictor includes a wall and a base that define a cup-like receptacle facing toward the mouth and that an obstructor ball is inserted into the airway through the mouth to simulate blockage of a victim's airway. This patent is unconcerned with providing an anatomically correct internal airway for training purposes and further is unconcerned with abnormal airway anatomies.

Rene' M. Gonzalez, M. D. and John J. Schaefer, III, M.D., "A New Method For Teaching The ASA Difficult Airway Management Algorithm Using A Full-Scale Human Simulator", *ANESTHESIOLOGY*, Vol. 85, No.3A, Sep. 24, 1996, discloses a computer controlled mannequin with an anatomically correct upper airway and mechanical lungs which produce carbon dioxide when ventilated. This article states that the computer controlled mannequin also produces detectable electrocardiogram and other physiologic signals. This article sets forth that the computer controlled mannequin has concealed mechanical and pneumatic modifications developed by the authors such that the mannequin's airway anatomy may be converted into varying degrees of pathology ranging from difficult to impossible. This article states that some of the mechanical and pneumatic modifications are computer activated and produce restricted mouth opening, restricted neck extension, tongue swelling, posterior or lateral pharyngeal swelling, and poor pulmonary compliance. The inventors of the mechanical mannequin apparatus of the instant invention as described in this patent application are the authors of this article.

In spite of this background art, there remains a very real and substantial need for an inexpensive mechanical mannequin apparatus as provided by the instant invention for teaching the principles of medical management of human patients that present with normal or abnormal airway anatomy, or a combination thereof.

SUMMARY OF THE INVENTION

The present invention has met the above-described need. The mechanical mannequin apparatus of the present invention provides an efficient and economical mechanical simulator having an anatomically correct airway of a human that may be selectively converted by an operator (ie. instructor) from a normal airway anatomy to an abnormal human airway for teaching the principles of advanced medical airway management.

The mechanical mannequin of the present invention provides a head region having an adjustable jaw, an adjustable neck region located below and in communication with the head region, and a chest region located below and in communication with the neck region. The head region and the neck region of the present invention further comprise an upper airway having (a) at least one nostril aperature, (b) a nasal cavity having a proximal end, a distal end and a middle section that is disposed between the proximal end and the distal end of the nasal cavity, and wherein the nostril aperature is located at the proximal end of the nasal cavity, (c) an oral cavity having a proximal end, a distal end and a middle section disposed between the proximal end and the distal end of the oral cavity, and wherein the oral cavity is located below the nasal cavity, (d) a mouth opening located at the proximal end of the the oral cavity, and wherein the mouth opening has an opening size determined by the relative position of the adjustable jaw, (e) a pharynx tube member having a proximal end, a distal end and a middle section disposed between the proximal end and the distal end of the pharynx tube member, wherein the proximal end of the pharynx tube member is located below and in communication with the distal end of the nasal cavity, and wherein the distal end of the oral cavity is located at and in communication with the middle section of the pharynx tube member, and (f) a larynx tube member having a proximal end, a distal end and a middle section disposed between the proximal end and the distal end of the larynx tube member, and wherein the larynx tube member lies below the oral cavity and in front of the pharynx tube member, and wherein the proximal end of the larynx tube member is located at and in communication with the distal end of the pharynx tube member. The chest region of the present invention further comprises a lower airway having (a) a trachea tube member having a proximal end, a distal end and a middle section disposed between the proximal end and the distal end of the trachea tube member, wherein the proximal end of the trachea tube member is located below and in communication with the distal end of the larynx tube member, (b) at least one bronchus tube member having a proximal end, a distal end and a middle section disposed between the proximal end and the distal end of the bronchus tube member, wherein the proximal end of the bronchus tube member is located below and in communication with the distal end of the trachea tube member, and (c) at least one inflatable lung sac structure having a proximal end, a distal end and a middle section disposed between the proximal end and the distal end of the inflatable lung sac structure. The proximal end of the inflatable lung sac structure is located below and is in communication with the distal end of the bronchus tube member.

The mechanical mannequin apparatus of the present invention further provides an esophagus tube member having a proximal end, a distal end and a middle section disposed between the proximal end and the distal end of the esophagus tube member. The esophagus tube member is located behind the trachea tube member and wherein the proximal end of the esophagus tube member is located below and in communication with the distal end of the pharynx tube member.

The presention invention further provides a stomach bag structure having a proximal end, a distal end and a middle section disposed between the proximal end and the distal end of the stomach bag structure. The proximal end of the stomach bag structure is located below and in communication with the distal end of the esophagus tube member.

The present invention further provides jaw adjusting means for opening, closing and selectively adjusting the movement and the position of the adjustable jaw for effecting the desired size of the mouth opening. The jaw adjusting means is located in juxtaposition to and in communication with the head region.

The present invention further provides neck adjusting means for selectively adjusting the movement and the position of the adjustable neck region. The neck adjusting means is in juxtaposition to and in communication with a portion of the adjustable neck region and the head region. Further, the present invention provides at least one restrictor means attached to at least a portion of at least one of the nasal cavity, oral cavity, pharynx tube member, larynx tube member, trachea tube member, and bronchus tube member for causing sealing engagement against and volume restriction of at least one of the nasal cavity, oral cavity, pharynx tube member, larynx tube member, trachea tube member, and bronchus tube member.

In another embodiment of the present invention, the mechanical mannequin apparatus, as defined herein, further includes wherein the restrictor means, as defined herein, comprises an inflatable bladder member that is in communication with an inflatable conduit member. The inflatable conduit member has a first end in communication with the inflatable bladder member. An inflation supply means is provided having a first end in communication with a second end of the inflation conduit member for transferring for example but not limited to air to the inflation conduit member and into the inflatable bladder member for effecting selective engagement of the inflatable bladder member against at least a portion of the nasal cavity, oral cavity, pharynx tube member, larynx tube member, trachea tube member and bronchus tube member and for effecting volume restriction of at least a portion of at least one of the nasal cavity, oral cavity, pharynx tube member, larynx tube member, trachea tube member, and bronchus tube member. Preferably, the selective engagement of the inflatable bladder member is a sealing engagement against at least a portion of the nasal cavity, oral cavity, pharynx tube member, larynx tube member, trachea tube member, and the bronchus tube member.

In yet another embodiment of the present invention, the mechanical mannequin apparatus, as defined herein, further includes a tongue structure that is located within the oral cavity. The tongue structure has a proximal end, a distal end and a middle section disposed between the proximal end and the distal end of the tongue structure. The proximal end of the tongue structure is attached to the distal end of the oral cavity at the interior of the adjustable jaw.

Another embodiment of the mechanical mannequin apparatus of this invention, as defined herein, includes an epiglottis structure located at the proximal end of the larynx. The epiglottis structure has a proximal end, a distal end and a middle section disposed between the proximal end and the distal end of the epiglottis structure. The proximal end of the epiglottis structure is in communication with the anterior surface of the entrance to the larynx. The distal end of the epiglottis structure protrudes toward the posterior surface of the larynx entrance.

The mechanical mannequin apparatus of the present invention will be more fully understood from the following descriptions of the invention, the drawings, and the claims appended hereto.

DETAILED DESCRIPTION OF THE INVENTION

The present invention provides for a mechanical mannequin apparatus for teaching the principles of medical airway management of human normal and abnormal or difficult airway anatomies.

Figure 1:
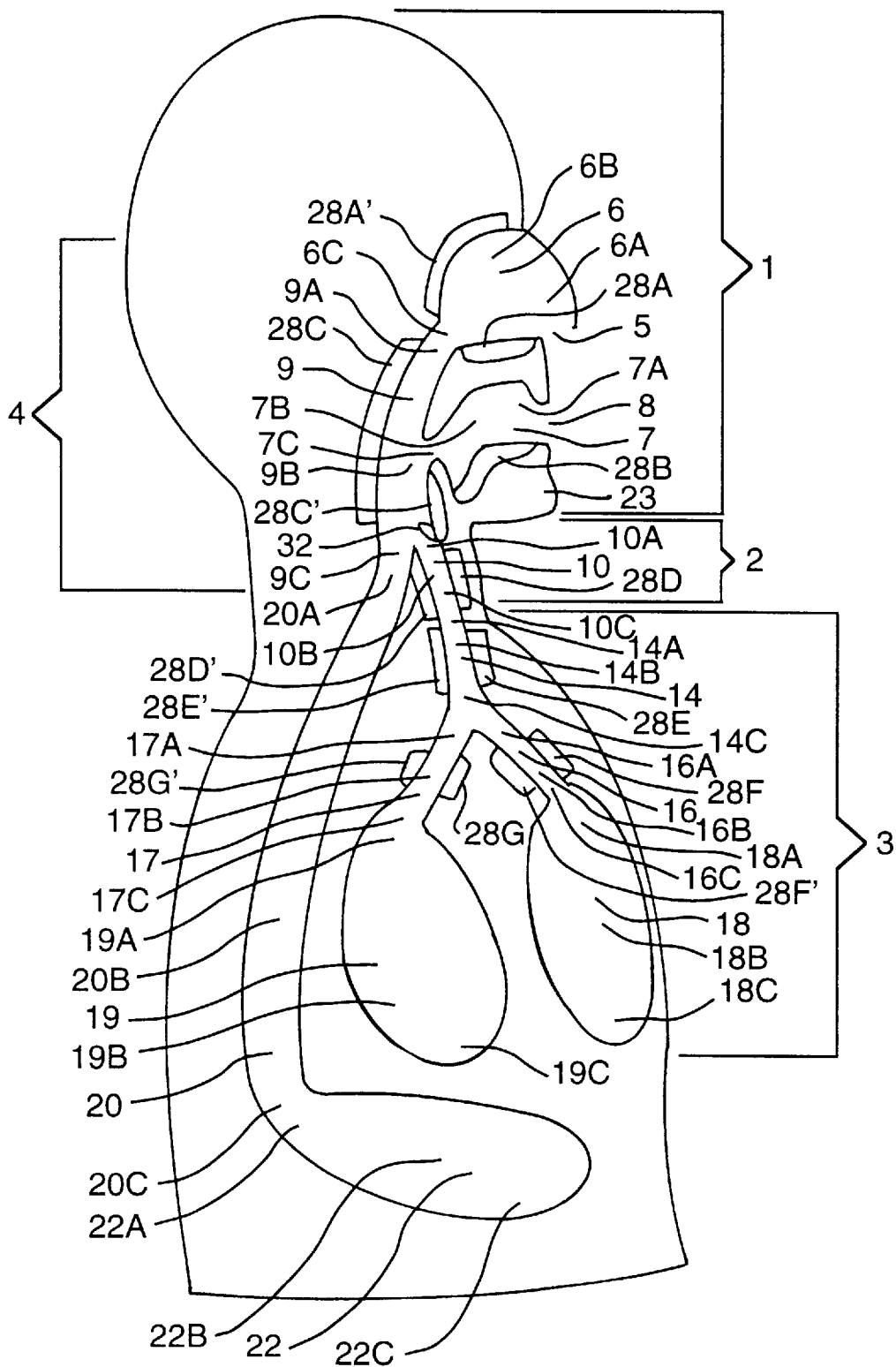
FIG. 1 is a sectional side view of a form of the mechanical mannequin apparatus of the present invention.

FIGS. 1–4 illustrate various views of a preferred form of the mechanical mannequin apparatus of the present invention. In FIG. 1, a mechanical mannequin apparatus having a head region 1, an adjustable neck region 2, a chest region 3, an esophagus tube member 20, a stomach bag structure 22, and at least one restrictor means 28A, 28A', 28B, 28C, 28C', 28D, 28D', 28E, 28E', 28F, 28F', 28G and 28G'. The head region 1 has an adjustable jaw 23. It will be understood by those skilled in the art that the adjustable jaw 23 has an exterior surface and an interior surface. The adjustable jaw 23 is connected to the head region 1 via jaw adjusting means 24 (shown in FIG. 2).

The mechanical mannequin apparatus of the present invention is made of one or more resilient materials, such as for example but not limited to a rubber or rubber like material or an elastomeric material such as for example plastic. The skin covering the exterior of the mannequin is also made of a resilient material. The mechanical mannequin apparatus of the present invention is molded of these resilient materials such as to approximate an anatomically correct human airway anatomy and which approximates the flexibility and resilience of each of the human body parts and structures.

In FIG. 1, the adjustable neck region 2 is located below and is in communication with the head region 1. The chest region 3 is located below and is in communication with the adjustable neck region 2. In FIG. 1, the head region 1 and the adjustable neck region 2 further comprise an upper airway 4 having (a) at least one nostril aperature 5, (b) a nasal cavity 6 having a proximal end 6A, a distal end 6C, and a middle section 6B that is disposed between the proximal end 6A and the distal end 6C of the nasal cavity 6, (c) an oral cavity 7 having a proximal end 7A, a distal end 7C, and a middle section 7B that is disposed between the proximal end 7A and the distal end 7C of the oral cavity 7, (d) a mouth opening 8 located at the proximal end 7A of the oral cavity 7, (e) a pharynx tube member 9 having a proximal end 9A, a distal end 9C, and a middle section 9B that is disposed between the proximal end 9A and the distal end 9C of the pharynx tube member 9, and (f) a larynx tube member 10 having a proximal end 10A, a distal end 10C, and a middle section 10B that is disposed between the proximal end 10A and the distal end 10C of the larynx tube member 10.

FIG. 1 shows that the nostril aperature 5 is located at the proximal end 6A of the nasal cavity 6. The oral cavity 7 is located below the nasal cavity 6. It will be appreciated by those skilled in the art that the opening dimension (ie. size) of the mouth opening 8 is determined by the position of the adjustable jaw 23.

FIG. 1 shows that the pharynx tube member 9 is placed behind the nasal cavity 6, oral cavity 7, and larynx tube member 10. FIG. 1 shows that the proximal end 9A of the pharynx tube member 9 is located below and in communication with the distal end 6C of the nasal cavity 6. The distal end 7C of the oral cavity 7 is located at and is in communication with the middle section 9B of the pharynx tube member 9. The larynx tube member 10 lies below the oral cavity 7 and is in front of the pharynx tube member 9. The proximal end 10A of the larynx tube member 10 is located at and is in communication with the distal end 9C of the pharynx tube member 10.

FIG. 1 shows that the chest region 3 comprises a lower airway (not identified by a number designation in the figures). The lower airway has (a) a trachea tube member 14 having a proximal end 14A, a distal end 14C, and a middle section 14B that is disposed between the proximal end 14A and the distal end 14C of the trachea tube member 14, (b) at least one bronchus tube member 16 and 17, respectively, each having a proximal end 16A and 17A, respectively, a distal end 16C and 17C, respectively, and a middle section 16B and 17B, respectively, that is disposed between the proximal end 16A and 17A, respectively, and the distal end 16C and 17C, respectively, of the bronchus tube member 16 and 17, respectively, and (c) at least one inflatable lung sac structure 18 and 19, respectively, each having a proximal end 18A and 19A, respectively, a distal end 18C and 19C, respectively, and a middle section 18B and 19B, respectively, that is disposed between the proximal end 18A and 19A, respectively, and the distal end 18C and 19C, respectively, of the inflatable lung sac structure 18 and 19, respectively.

FIG. 1 shows that the proximal end 14A of the trachea tube member 14 is located below and is in communication with the distal end 10C of the larynx tube member 10. The proximal end 16A and 17A, respectively, of the bronchus tube member 16 and 17, respectively, is located below and in communication with the distal end 14C of the trachea tube member 14. The proximal end 18A and 19A, respectively, of the inflatable lung sac structure 18 and 19, respectively, is located below and is in communication with the distal end 16C and 17C, respectively, of the bronchus tube member 16 and 17, respectively.

FIG. 1 shows an esophagus tube member 20 having a proximal end 20A, a distal end 20C, and a middle section 20C that is disposed between the proximal end 20A and the distal end 20C of the esophagus tube member 20. The esophagus tube member 20 is located behind the trachea tube member 14. The proximal end 20A of the esophagus tube member 20 is located below and is in communication with the distal end 9C of the pharynx tube member 9.

In FIG. 1, the stomach bag structure 22 has a proximal end 22A, a distal end 22C, and a middle section 22B that is disposed between the proximal end 22A and the distal end 22C of the stomach bag structure 22. The proximal end 22A of the stomach bag structure is located below and is in communication with the distal end 20C of the esophagus tube member 20.

It will be appreciated by those skilled in the art that the various tube members defined herein have a generally annular inner surface and a generally annular outer surface (not shown in the figures). It will be understood by those skilled in the art that the proximal end and the distal end of each of the various tube members defined herein are open and that the middle section of each of the various tube members defined herein generally comprises a central lumen that is disposed between the distal open end and the proximal open end of each tube member such that air may flow through one of the tube members of the mannequin's airway and into another tube member of the mannequin's airway in which it is in communication with or such that an airway management device such as for example but not limited to an endotracheal tube may be inserted into one or more of the tube members of the mannequin's upper and lower airways to establish a viable airway to effect ventilation or oxygenation of at least one of the inflatable lung sac structure 18 and 19, respectively.

Figure 2:
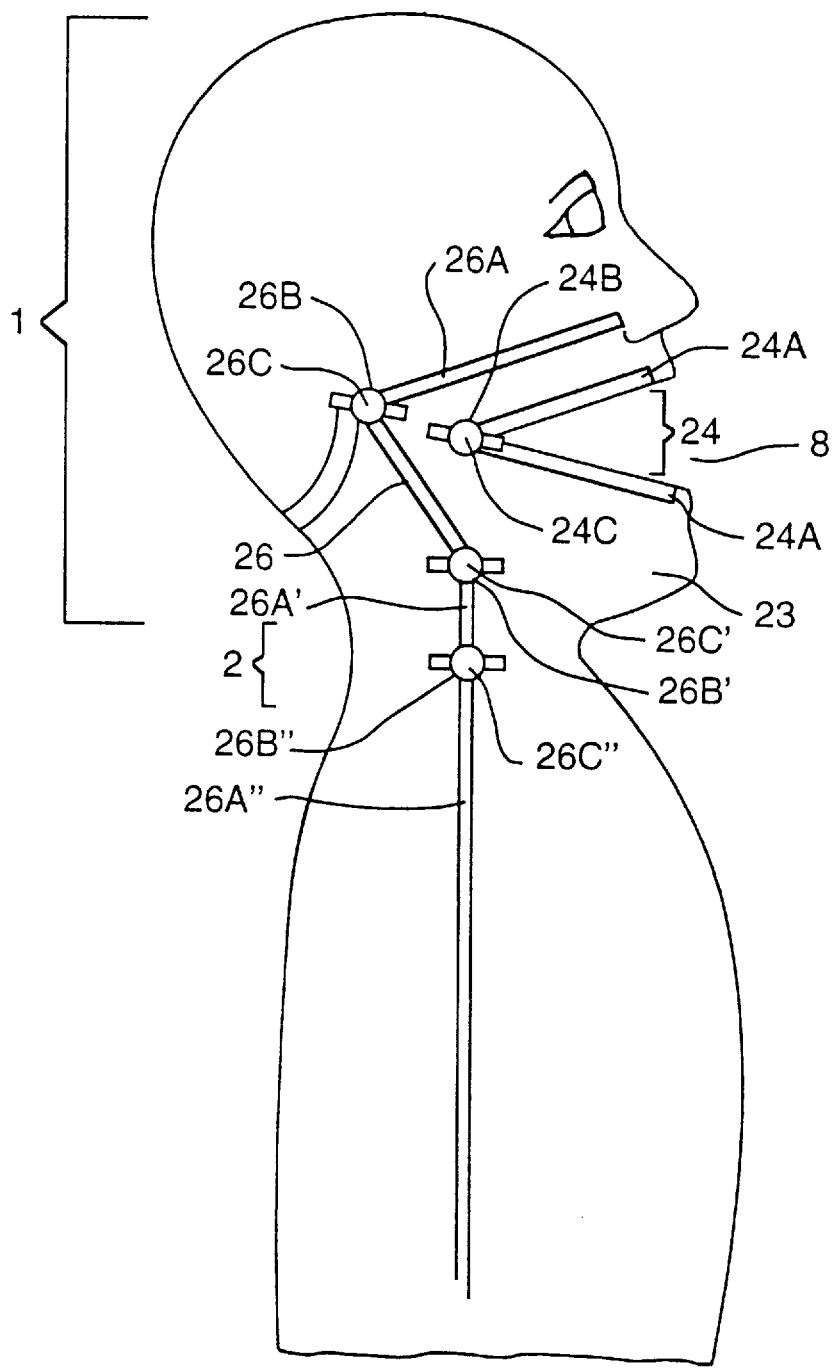
FIG. 2 is a right side view of a form of the mechanical mannequin apparatus of the present invention that shows the jaw adjusting means and the neck adjusting means.

FIG. 2 shows jaw adjusting means 24 for selectively moving the position of the adjustable jaw 23. Thus, the jaw adjusting means 24 for opening, closing and adjusting the movement and the position of the adjustable jaw 23 effects the opening dimension (ie. size) of the mouth opening 8. In FIG. 2, the jaw adjusting means 24 is located in juxtaposition to and in communication with the head region 1. FIG. 2 shows that the jaw adjusting means 24 is preferably at least one jaw hinge 24A having at least one jaw hinge joint 24B and that a jaw hinge screw 24C passes through the jaw hinge joint 24B of the jaw hinge 24A. The jaw hinge screw 24C is in friction engagement with the jaw hinge joint 24B. For example, turning the jaw hinge screw 24C in a clockwise direction establishes a tightening effect on the jaw hinge joint 24B of the jaw hinge 24A to establish a fixed position of the jaw hinge joint 24B and therefore a fixed position of the adjustable jaw 23. Turning the jaw hinge screw 24C in a counter-clockwise direction establishes a loosening effect on the jaw hinge joint 24B to establish movement of the adjustable jaw 23 such that the adjustable jaw 23 may be moved or adjusted either upward or downward relative to the longitudinal axis (not shown) of the mechanical mannequin apparatus of this invention. Thus, it will be appreciated that the opening dimension of the mouth opening 8 may be made very small or restricted to resemble a number of medical conditions such as for example but not limited to severe arthritis, or "lock jaw" (tetanus).

FIG. 2 shows neck adjusting means 26 for adjusting the movement and the position of the adjustable neck region 2 of this invention. The neck adjusting means 26 is in juxtaposition to and in communication with a portion of both the head region 1 and the adjustable neck region 2. FIG. 2 shows a preferred embodiment of the neck adjusting means 26 which includes at least one neck hinge 26A, 26A', and 26A", respectively, having at least one neck hinge joint 268, 26B' and 26B", respectively, and at least one neck hinge screw 26C, 26C' and 26C", respectively, that passes through at least one of the neck hinge joint 26B, 26B' and 26B", respectively. It will be understood by those skilled in the art that the friction engagement principles stated hereinbefore relative to jaw hinge screw 24C, are equally applicable at this juncture relative to neck hinge screw 26C, 26C', and 26C", or a combination thereof, for adjusting the movement and position of the adjustable neck region 2 and head region 1 such that the head region 1 may be selectively tilted backwards and forwards relative to the longitudinal axis (not shown) of the mechanical mannequin apparatus of this invention. It will be appreciated by those skilled in the art that the head region 1 and the adjustable neck region 2 may be tightened or locked into a fixed position such as to resemble the medical conditions of a human presenting with very restricted neck motion such as for example but not limited to severe arthritis, neck or spine fracture or immobilization collar or a history of surgery or radiation therapy in the neck area producing scarring of tissue that results in limited neck mobility.

Preferably, the jaw adjusting means 24 and the neck adjusting means 26 are concealed (but accessible to the instructor) under the resilient material making up the skin of the mechanical mannequin of this invention.

Figure 3:
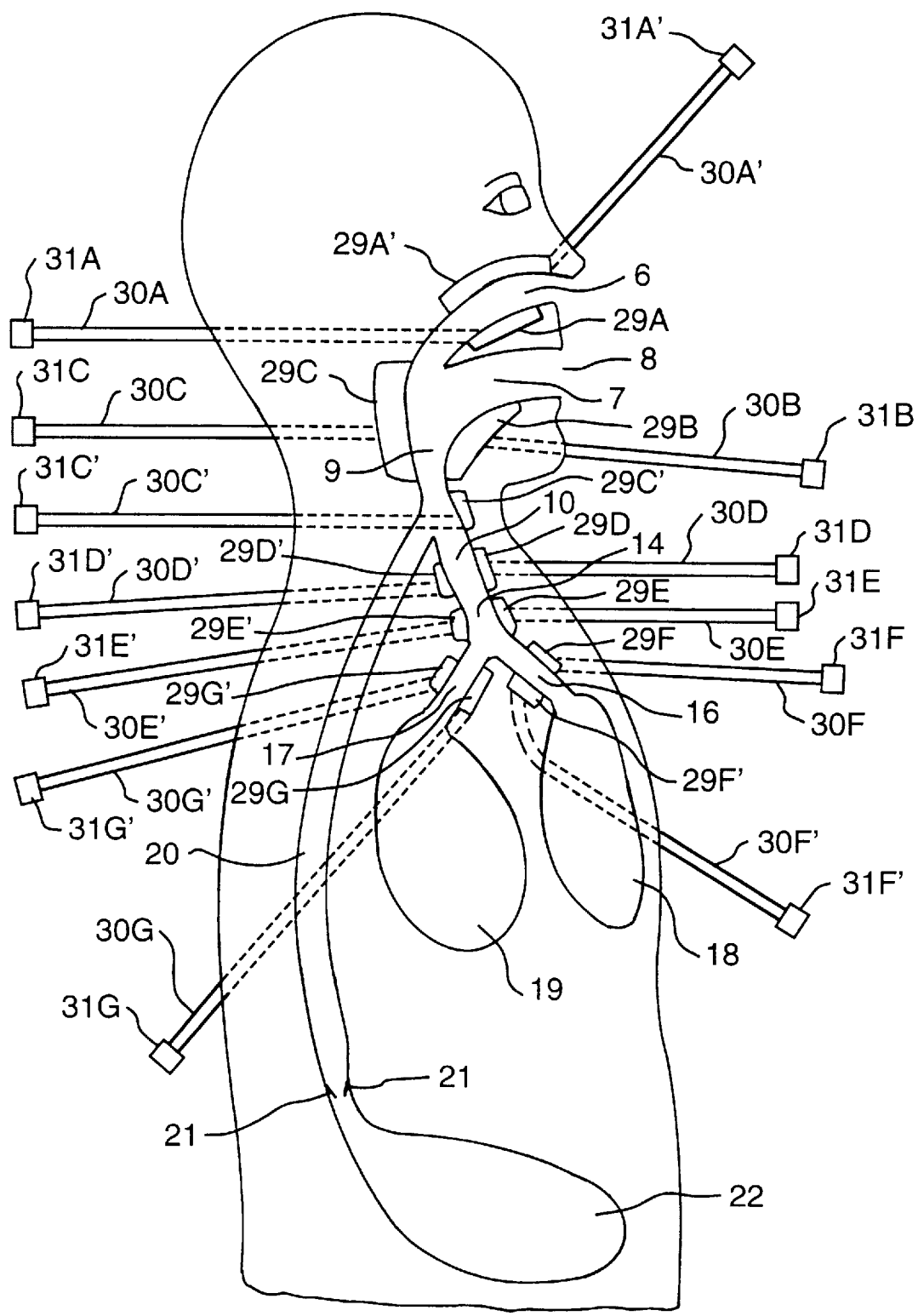
FIG. 3 is a sectional side view of a form of the mechanical apparatus of the present invention that shows the inflatable bladder member(s) and inflation conduit member(s).

FIGS. 1 and 3 show that the mechanical mannequin of this invention includes at least one restrictor means 28(X), [wherein X equals A, A', B, C, C', D, D', E, E', F, F', G, and G', respectively, and combinations thereof], located within the mechanical mannequin and attached to a portion of the airway anatomy of the mechanical mannequin for causing sealing engagement against and volume restriction of a portion of the mechanical mannequin's airway anatomy such as to resemble the airway anatomy of a human presenting with the medical condition such as for example but not limited to an airway tumor, inflammation, infection, trauma and congenital abnormality, all of which distort and/or restrict the volume of the affected airway anatomy. FIG. 1 shows a preferred embodiment of the present invention including at least one restrictor means 28A and 28A', 28B, 28C and 28C', 28D, 28D', 28E, 28E', 28F, 28F', 28G, and 28G' attached to at least a portion of at least one of the nasal cavity 6, oral cavity 7, pharynx tube member 9, larynx tube member 10, trachea tube member 14, and bronchus tube member 16 and 17, respectively, and combinations thereof.

FIG. 3 shows the restrictor means 28(X) of the present invention, as described hereinbefore, including wherein the restrictor means 28(X) preferably is an inflatable bladder member (or cuff) 29(X) in communication with an inflation conduit member 30(X), [wherein X is as defined hereinbefore], respectively. The inflatable bladder member 29(X) is attached to at least a portion of at least one of the surfaces of the nasal cavity 6, oral cavity 7, pharynx tube member 9, larynx tube member 10, trachea tube member 14, and bronchus tube member 16 and 17, respectively, and combinations thereof, for causing sealing engagement of the inflatable bladder member 29(X) against and volume restriction of at least one of the nasal cavity 6, oral cavity 7, pharynx tube member 9, larynx tube member 10, trachea tube member 14, and bronchus tube member 16 and 17, respectively, and combinations thereof.

In a preferred embodiment of this invention, the restrictor means 28(X) is attached to and continuously or entirely encircles at least a portion of the axial extent of at least one or more of the various tube members, as described herein, to effect a medical condition resembling a total blockage or occlusion of the affected airway anatomy or as described in the ASA "emergency pathway".

FIG. 3 shows that the inflation conduit member 30(X), respectively, has a first end in communication with the inflatable bladder member 29(X), respectively. It will be understood that the first end of the inflation conduit member 30(X), respectively, lies within and thus is concealed within the mechanical mannequin. At least one inflation supply means 31(X), [wherein X is as defined hereinbefore], respectively, is provided in the present invention that has a first end in communication with a second end of the inflation conduit member 30(X), respectively, for transferring air or other fluid to the inflation conduit member 30(X), respectively, and into the inflatable bladder member 29(X), respectively, for effecting engagement of the inflatable bladder member 29(X), respectively, against at least a portion of at least one of the nasal cavity 6, oral cavity 7, pharynx tube member 9, larynx tube member 10, trachea tube member 14, and bronchus tube member 16 and 17, and combinations thereof.

It will be understood by those skilled in the art that it is preferable that the second end of the inflation conduit member 30(X), respectively, and the inflation supply means 31(X), respectively, are adapted to be positioned outside of the mechanical mannequin so that the operator (ie. instructor) of the mechanical mannequin may vary the airway anatomy to resemble human airway anatomies ranging from normal to abnormal, including the ASA "emergency pathway", and vice versa.

It will be appreciated that the inflation supply means 31(X), respectively, may be for example but not limited to a pump, a syringe or other mechanical devices known by those skilled in the art for forcing air, or other gases or fluids into the inflation conduit member 30(X), respectively, and into the inflatable bladder member 29(X), respectively. It will be understood that the inflated inflatable bladder member 29(X), respectively, may be deflated by permitting the air, other gas or fluid to travel out of the inflatable bladder member 29(X), respectively, and through the inflation conduit member 30(X), respectively, and into the inflation supply means 31(X), respectively. It will be appreciated that the inflation supply means 31(X), respectively, may include a pilot balloon member(s) (not shown) for monitoring the extent of inflation of the inflatable bladder member 29(X), respectively. Further, it will be appreciated that the inflation supply means 31(X), respectively, may include inflation supply valve means (not shown) for effecting the inflation and deflation of the inflatable bladder member 29(X), respectively.

Figure 4:
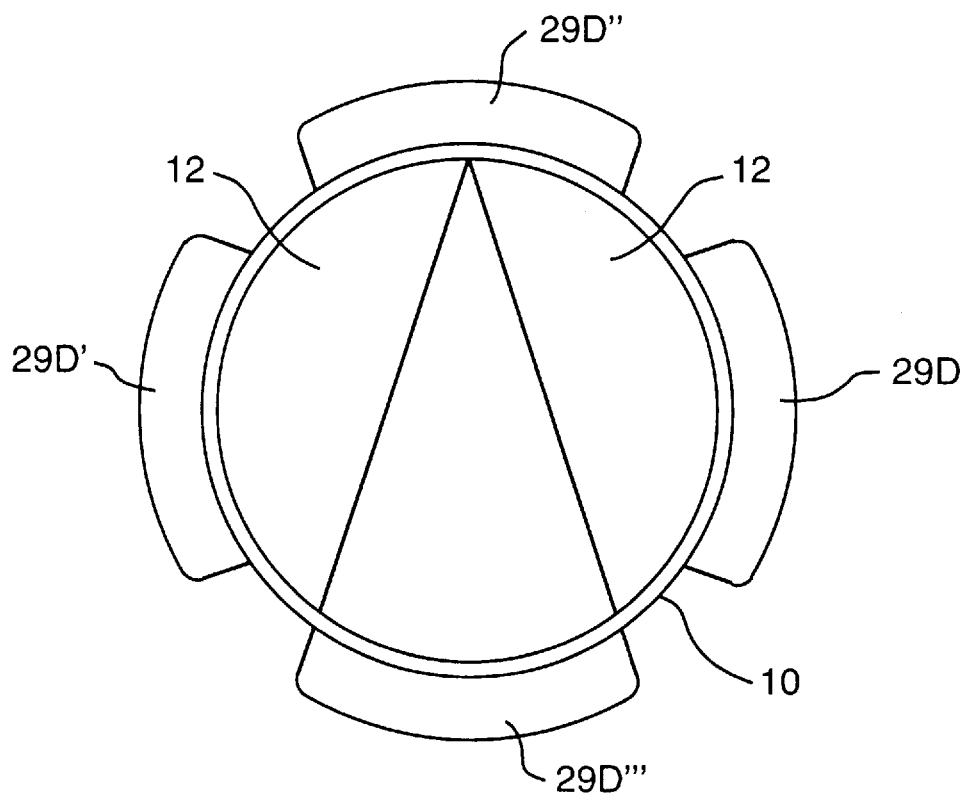
FIG. 4 is a cross-sectional view of the larynx tube member that shows a preferred embodiment of the present invention that includes multiple inflatable bladder members surrounding the larynx tube member.

FIG. 4 shows a cross-sectional view of a preferred embodiment of the larynx tube member 10 wherein four inflatable bladder members 29D, 29D', 29D", and 29D''' are attached to at least a portion of the larynx tube member 10 for causing sealing engagement against and volume restriction of the larynx tube member 10. FIG. 4 shows vocal cords 12.

FIGS. 1 and 3 show the mechanical mannequin of the present invention wherein the chest region 3 includes at least one inflatable lung sac structure, as described herein. Preferably, the chest region 3 includes an inflatable right lung sac structure 19, right bronchus tube member 17, an inflatable left lung sac structure 18 and left bronchus tube member 16, as described herein.

FIG. 3 shows the mechanical mannequin of the instant invention that includes valve means 21, located within the distal end 20C of the esophagus tube member 20 and in juxtaposition to the proximal end 22A of the stomach bag structure 22, for opening and closing the entrance to the stomach bag structure 22. It is preferable that valve means 21 be a one way valve for permitting entry into the stomach bag structure 22. In another embodiment of this invention, it is preferable that noise generation means (not shown) be located below or more preferably within the valve means 21 for producing a sound upon entry of a gas such as for example but not limited to air into the stomach bag structure 22 through the valve means 21. The noise generation means simulates the realistic sound produced if air is inadvertently forced through the esophagus and into the stomach during an incorrectly performed artificial respiration technique. For example, the noise generation means may be a conventional whistle casing containing a reed (ie. a reed whistle) known by those skilled in the art.

In another embodiment of the mechanical mannequin apparatus of the present invention, as described herein, an epiglottis structure 32 located at the proximal end 10A of the larynx tube member 10 is provided as set forth in FIG. 1. The epiglottis structure 32 has a proximal end (not designated by a numeral in the figures), a distal end (not designated by a numeral in the figures), and a middle section (not designated by a numeral in the figures) that is disposed between the proximal end and the distal end of the epiglottis structure 32. The proximal end of the epiglottis structure 32 is in communication with the anterior surface of the entrance of the larynx tube member 10. The distal end of the epiglottis structure 32 protrudes toward the posterior surface of the entrance to the larynx tube member 10.

Another embodiment of this invention provides for a tongue structure (not shown) located within the oral cavity 7. The tongue structure has a proximal end, a distal end and a middle section disposed between the proximal end and distal end of the tongue structure. The proximal end of the tongue structure is attached to the distal end 7C of the oral cavity 7 at the interior of the adjustable jaw 23.

Another embodiment of the instant invention includes the mechanical mannequin apparatus as described herein including a set of teeth (not shown) positioned in the oral cavity 7 such as to resemble the teeth of a real human being. Preferably, the teeth are removable by the operator (ie. instructor) of the mannequin from the oral cavity 7. In a more preferable embodiment of this invention, the teeth are elongated and protrude from the oral cavity 7 such as to resemble a set of teeth of a real human being having an overbite or prominent incisor teeth.

Another embodiment of the present invention includes the mechanical mannequin apparatus as described herein including carbon dioxide gas production means (not shown) for continuously delivering an amount of carbon dioxide gas to at least one of the inflatable lung sac structure 18 and 19, respectively, or the bronchus tube member 16 and 17, respectively, for simulating the normal elimination of carbon dioxide from the human body via the lungs, and for allowing for the utilization of a carbon dioxide detection device (not shown) commonly employed in the clinical setting as known by those skilled in the art as one medical technique routinely used to detect adequate ventilation of the lungs of a human being.

Another embodiment of the present invention provides pulse oximeter means for simulating the detection of the level of oxygenation of at least one of the inflatable lung sac structure 18 and 19, respectively. The pulse oximeter means is a simulation of the pulse oximeter device commonly employed in clinical medical practice for detecting and displaying the adequacy of oxygenation of a patient's lung(s) and blood. The pulse oximeter means of the present invention is under the control of the operator (ie. instructor) of the mechanical mannequin such that the operator may make the trainee believe that the mechanical mannequin's blood oxygen level is dropping to dangerously low levels to simulate realistic clinical settings encountered with human patients such as for example but not limited to the ASA "emergency pathway".

It will be understood by those skilled in the art that the mechanical mannequin apparatus provided for in the instant invention resembles the normal human airway anatomy and thus accommodates all conventional ventilation and intubation tools that are employed to establish and maintain an adequate airway anatomy in a human being. For example, all laryngoscope blades, fiberoptic intubation, intubating stylet or tube changer, light wand, retrograde intubation, transtracheal jet ventilation, laryngeal mask ventilation, and esophageal-tracheal combitube ventilation may be demonstrated successfully and completely using the mechanical mannequin of the present invention. Further, it will be appreciated by those skilled in the art that many of the elements of the upper airway of the mechanical mannequin of the present invention may be visualized by inspecting the oral and nasal cavities of the mannequin in such the same manner as would be done by a medical practitioner when assessing the clinical status of a real human patient's airway anatomy.

It will be appreciated by those skilled in the art that the relative dimensions and configurations of the mechanical mannequin's airway elements of the instant invention as described herein may be made to resemble the anatomically correct airway of an infant, child or adult human being which may be varied from a normal airway anatomy to an abnormal airway anatomy according to the spirit of the invention described herein.

It will be appreciated by those skilled in the art that the present invention advantageously provides for an efficient and inexpensive mechanical mannequin having an anatomically correct human airway for teaching the principles of realistic medical management of airway anatomies ranging from normal to abnormal to the impossible ASA "emergency pathway". Thus, it will be appreciated that the present invention has met the long unmet and unsolved need in the medical teaching community in providing a mechanical mannequin for demonstrating advanced airway training.

Whereas particular embodiments of the present invention have been described herein for the purpose of illustration, it will be evident to those skilled in the art that numerous variations of the details of the present invention may be made without departing from the invention as defined in the appended claims.

What is claimed is:

1. A mechanical mannequin apparatus for demonstrating medical management of human normal and abnormal airways comprising:

a head region having an adjustable jaw;

an adjustable neck region located below and in communication with said head region;

a chest region located below and in communication with said adjustable neck region;

wherein said head region and said adjustable neck region further comprising an upper airway having (a) at least one nostril aperature, (b) a nasal cavity having a proximal end, a distal end and a middle section that is disposed between said proximal end and said distal end of said nasal cavity, and wherein said nostril aperature is located at said proximal end of said nasal cavity, (c) an oral cavity having a proximal end, a distal end and a middle section disposed between said proximal end and said distal end of said oral cavity, said oral cavity located below said nasal cavity, (d) a mouth opening located at said proximal end of said oral cavity, said mouth opening having an opening size determined by the position of said adjustable jaw, (e) a pharynx tube member having a proximal end, a distal end and a middle section disposed between said proximal end and said distal end of said pharynx tube member, wherein said proximal end of said pharynx tube member is located below and in communication with said distal end of said nasal cavity and wherein said distal end of said oral cavity is located at and in communication with said middle section of said pharynx tube member, and (f) a larynx tube member having a proximal end, a distal end and a middle section disposed between said proximal end and said distal end of said larynx tube member, wherein said larynx tube member lies below said oral cavity and in front of said pharynx tube member and wherein said proximal end of said larynx tube member is located at and in communication with said distal end of said pharynx tube member;

wherein said chest region further comprising a lower airway having (a) a trachea tube member having a proximal end, a distal end and a middle section disposed between said proximal end and said distal end of said trachea tube member, wherein said proximal end of said trachea tube member is located below and in communication with said distal end of said larynx tube member, (b) at least one bronchus tube member having a proximal end, a distal end and a middle section disposed between said proximal end and said distal end of said bronchus tube member, wherein said proximal end of said bronchus tube member is located below and in communication with said distal end of said trachea tube member, and (c) at least one inflatable lung sac structure having a proximal end, a distal end and a middle section disposed between said proximal end and said distal end of said inflatable lung sac structure, wherein said proximal end of said inflatable lung sac structure is located below and in communication with said distal end of said bronchus tube member;

an esophagus tube member having a proximal end, a distal end and a middle section disposed between said proximal end and said distal end of said esophagus tube member, wherein said esophagus tube member is located behind said trachea tube member and wherein said proximal end of said esophagus tube member is located below and in communication with said distal end of said pharynx tube member;

a stomach bag structure having a proximal end, a distal end and a middle section disposed between said proximal end and said distal end of said stomach bag structure, wherein said proximal end of said stomach bag structure is located below and in communication with said distal end of said esophagus tube member;

jaw adjusting means for opening, closing and adjusting the movement and the position of said adjustable jaw for effecting the opening size of said mouth opening, wherein said jaw adjusting means is located in juxtaposition to and in communication with said head region;

neck adjusting means for adjusting the movement and the position of said adjustable neck region and said head region, wherein said neck adjusting means is in juxtaposition to and in communication with a portion of said adjustable neck region and said head region; and at least one restrictor means attached to at least a portion of at least one of said nasal cavity, oral cavity, pharynx tube member, larynx tube member, trachea tube member, and bronchus tube member, and combinations thereof, for causing sealing engagement against and volume restriction of at least one of said nasal cavity, oral cavity, pharynx tube member, larynx tube member, trachea tube member, and bronchus tube member, and combinations thereof.

2. The mechanical mannequin apparatus of claim 1 wherein said restrictor means includes at least one inflatable bladder member in communication with at least one inflation conduit member, said inflation conduit member having a first end in communication with said inflatable bladder member.

3. The mechanical mannequin apparatus of claim 2 including at least one inflation supply means having a first end that is in communication with a second end of at least one of said inflation conduit member for transferring air into said inflation conduit member and into at least one of said inflatable bladder member for effecting sealing engagement of said inflatable bladder member against at least a portion of at least one of said nasal cavity, oral cavity, pharynx tube member, larynx tube member, trachea tube member, and bronchus tube member, and combinations thereof, and for effecting volume restriction of at least a portion of at least one of said nasal cavity, oral cavity, pharynx tube member, larynx tube member, trachea tube member, and bronchus tube member, and combinations thereof.

4. The mechanical mannequin apparatus of claim 1 wherein two or more restrictor means are attached to said larynx tube member.

5. The mechanical mannequin apparatus of claim 1 wherein said chest region includes an inflatable right lung sac structure and an inflatable left lung sac structure.

6. The mechanical mannequin apparatus of claim 5 wherein said chest region includes a right bronchus tube member and a left bronchus tube member.

7. The mechanical mannequin apparatus of claim 6 wherein said proximal end of said inflatable right lung sac structure is in communication with said distal end of said right bronchus tube member, and wherein said proximal end of said inflatable left lung sac structure is in communication with said distal end of said left bronchus tube member.

8. The mechanical mannequin apparatus of claim 1 including valve means located within said distal end of said esophagus tube member in juxtaposition to said proximal end of said stomach bag structure for opening and closing an entry to said stomach bag structure.

9. The mechanical mannequin apparatus of claim 8 including wherein said valve means is a one way valve for permitting entry into said stomach bag structure.

10. The mechanical mannequin apparatus of claim 8 including noise generation means located below said valve means for producing a sound upon entry of a gas into said stomach bag structure through said valve means.

11. The mechanical mannequin apparatus of claim 8 including noise generation means located within said valve means for producing a sound upon entry of a gas into said valve means.

12. The mechanical mannequin apparatus of claim 1 wherein said jaw adjusting means is at least one jaw hinge having a jaw hinge joint and a jaw hinge screw, wherein said jaw hinge screw passes through said jaw hinge joint and is in friction engagement with said jaw hinge joint for adjusting the movement and the position of said adjustable jaw.

13. The mechanical mannequin apparatus of claim 12 wherein said jaw hinge screw is tightened for effecting friction engagement of said jaw hinge screw with said jaw hinge joint for establishing a desired fixed position of said adjustable jaw.

14. The mechanical mannequin apparatus of claim 1 wherein said neck adjusting means is at least one neck hinge having a neck hinge joint and a neck hinge screw, wherein said neck hinge screw passes through said neck hinge joint and is in friction engagement with said neck hinge joint for adjusting the movement and position of said adjustable neck region.

15. The mechanical mannequin apparatus of claim 14 wherein said neck hinge screw is tightened for effecting friction engagement of said neck hinge screw with said neck hinge joint for establishing a desired fixed position of said adjustable neck region.

16. The mechanical mannequin apparatus of claim 1 including an epiglottis structure located at the proximal end of said larynx, wherein said epiglottis structure having a proximal end, a distal end and a middle section disposed between said proximal end and said distal end of said epiglottis structure, and wherein said proximal end of said epiglottis structure is in communication with an anterior surface of an entrance to said larynx and wherein said distal end of said epiglottis structure protrudes toward a posterior surface of said larynx entrance.

17. The mechanical mannequin apparatus of claim 16 including having at least one of said restrictor means attached to at least a portion of said anterior surface of said larynx entrance for causing sealing engagement against and volume restriction of said larynx entrance.

18. The mechanical mannequin apparatus of claim 1 including a tongue structure located within said oral cavity, wherein said tongue structure having a proximal end, a distal end and a middle section disposed between said proximal end and said distal end of said tongue structure, said proximal end of said tongue structure is attached to said distal end of said oral cavity.

19. The mechanical mannequin apparatus of claim 1 including a set of teeth located within said oral cavity.

20. The mechanical mannequin apparatus of claim 19 including wherein said teeth are removable from said oral cavity.

21. The mechanical mannequin apparatus of claim 1 that resembles the human airway anatomy selected from the group of an infant, child and adult.

22. The mechanical mannequin apparatus of claim 1 including pulse oximeter means for simulating the detection of the level of oxygenation of at least one of said inflatable lung sac structure.

23. The mechanical mannequin apparatus of claim 1 including carbon dioxide gas production means for continuously delivering an amount of carbon dioxide gas to said inflatable lung sac structure.

24. The mechanical mannequin apparatus of claim 1 including carbon dioxide gas production means for continuously delivering an amount of carbon dioxide gas to said bronchus tube member.

* * * * *